United States Patent
Patel

(10) Patent No.: US 12,533,329 B2
(45) Date of Patent: Jan. 27, 2026

(54) COMPOSITIONS AND METHODS OF TREATMENT WITH GLUTATHIONE

(71) Applicant: Auro Pharmaceuticals, Inc., La Habra, CA (US)

(72) Inventor: Nayan Patel, Cerritos, CA (US)

(73) Assignee: Auro Pharmaceuticals, Inc., La Habra, CA (US)

(*) Notice: Subject to any disclaimer, the term of this patent is extended or adjusted under 35 U.S.C. 154(b) by 558 days.

(21) Appl. No.: 17/999,104

(22) PCT Filed: May 20, 2021

(86) PCT No.: PCT/US2021/033456
§ 371 (c)(1),
(2) Date: Nov. 17, 2022

(87) PCT Pub. No.: WO2021/236958
PCT Pub. Date: Nov. 25, 2021

(65) Prior Publication Data
US 2023/0210791 A1    Jul. 6, 2023

Related U.S. Application Data

(60) Provisional application No. 63/029,240, filed on May 22, 2020.

(51) Int. Cl.
| | | |
|---|---|---|
| A61K 9/00 | (2006.01) | |
| A61K 9/10 | (2006.01) | |
| A61K 31/145 | (2006.01) | |
| A61K 31/375 | (2006.01) | |
| A61K 31/724 | (2006.01) | |
| A61K 31/728 | (2006.01) | |
| A61K 38/06 | (2006.01) | |
| A61K 45/06 | (2006.01) | |
| A61P 31/12 | (2006.01) | |
| A61P 31/14 | (2006.01) | |
| A61P 39/06 | (2006.01) | |
| C08L 5/16 | (2006.01) | |

(52) U.S. Cl.
CPC .......... *A61K 31/145* (2013.01); *A61K 9/0014* (2013.01); *A61K 31/375* (2013.01); *A61K 31/724* (2013.01); *A61K 45/06* (2013.01); *A61P 31/14* (2018.01)

(58) Field of Classification Search
CPC .......... A61K 9/00; A61K 9/10; A61K 31/375; A61K 31/724; A61K 31/728; A61K 38/06; A61K 38/063; A61K 45/06; A61P 31/12; A61P 39/06; C08L 5/16; C08J 2305/16

See application file for complete search history.

(56) References Cited

U.S. PATENT DOCUMENTS

| | | | |
|---|---|---|---|
| 6,573,299 | B1 | 6/2003 | Petrus |
| 10,328,152 | B2 * | 6/2019 | Patel .................... A61K 31/385 |
| 11,351,262 | B2 * | 6/2022 | Patel .................... A61K 31/724 |
| 11,602,564 | B2 * | 3/2023 | Patel .................... A61K 38/063 |
| 12,214,042 | B2 * | 2/2025 | Patel .................... A61K 31/724 |
| 2004/0067890 | A1 | 4/2004 | Gupta |
| 2012/0321603 | A1 | 12/2012 | Patel |
| 2016/0228490 | A1 | 8/2016 | Arnold et al. |
| 2017/0095561 | A1 | 4/2017 | Patel et al. |

FOREIGN PATENT DOCUMENTS

| | | |
|---|---|---|
| CN | 102100904 | 6/2011 |
| CN | 106074206 | 11/2016 |
| CN | 107812179 | 3/2018 |
| WO | WO 1998/030228 | 7/1998 |
| WO | WO 2018/172511 | 9/2018 |
| WO | WO 2021/236958 | 11/2021 |

OTHER PUBLICATIONS

Spearow et al., May 15, 2020, Review: improving therapeutics for COVID-19 with glutathione-boosting treatments that improve immune responses and reduce the severity of viral infections, OSF preprints, doi:10.31219/osf.io/y7wc2, 24 pp.

Horowitz, R.I., et al., "Efficacy of glutathione therapy in relieving dyspnea associated with COVID-19 pneumonia: A report of 2 cases", Respiratory Medicine Case Reports (2020) vol. 30, Article 101063, pp. 1-7 (Epub Apr. 21, 2020), Abstract; Section: 2.2. Case studies at pp. 3-4.

International Search Report for International Application No. PCT/US2021/033456, filed May 20, 2021, in 8 pages.

* cited by examiner

*Primary Examiner* — Brenda L Coleman
(74) *Attorney, Agent, or Firm* — Knobbe, Martens, Olson & Bear, LLP

(57) ABSTRACT

A topical composition comprising a nanonised L-glutathione and cyclodextrin complex, together with ascorbic acid in a weight ratio of glutathione to ascorbic acid from 7:1 to 15:1 and from 1:1 to 1:15 and a further compound comprising dexpanthenol, thiamine, benzalkonium chloride, sodium hyaluronate or acetyl-L-cysteine, which composition is topically administered for treating the symptoms of viral infection including COVID-19 and influenza, and for treating herpes simplex, herpes zoster, post herpetic neuralgia, genital herpes, alcohol detoxification, high triglycerides, age or liver spots and lupus.

19 Claims, No Drawings

COMPOSITIONS AND METHODS OF TREATMENT WITH GLUTATHIONE

RELATED APPLICATIONS

This application is a U.S. National Phase of International Application No. PCT/US2021/033456, filed on May 20, 2021, and published on Nov. 25, 2021, as WO 2021/236958, which claims the benefit of U.S. Provisional Patent Application No. 63/029,240, filed May 22, 2020, the entirety of each of which is hereby incorporated by reference.

FIELD

The subject matter disclosed herein relates to the field of pharmaceutical treatments. In particular, the subject matter relates to compositions and methods of treatment featuring glutathione.

BACKGROUND

Glutathione (c-glutamylcysteinylglycine, GSH) is the major thiolated small peptide present in living cells. Due to its reducing and nucleophilic properties, GSH acts as a redox buffer, thus preventing oxidative damage. Glutathione depletion has been observed in a number of disease conditions including lung and neurological diseases such as acute respiratory-disease, and Parkinson's-disease, respectively. Glutathione is indicated in the treatment of alcohol and drug poisoning, as well as for protection against toxicity induced by cytotoxic chemotherapy and radiation trauma and also in the treatment of AIDS-associated cachexia. It is desirable to apply the therapeutic effects of glutathione to the treatment of additional conditions.

SUMMARY

Provided herein is a topical composition comprising: reduced, nanonized, L-glutathione that is non-esterified, non-acetylated, and non-fatty acid attached; gamma cyclodextrin; ascorbic acid; and one or more compounds selected from the group consisting of: dexpanthenol, thiamine, benzalkonium chloride, sodium hyaluronate, and acetyl-L-cysteine; wherein the weight ratio of glutathione to ascorbic acid is between about 7:1 and 15:1. In another embodiment, the weight ratio of glutathione to ascorbic acid is between about 1:1 and 1:15. In another embodiment the one or more compounds are selected from the group consisting of: dexpanthenol, thiamine, benzalkonium chloride, sodium hyaluronate, acetyl-L-cysteine, and potassium sorbate.

DETAILED DESCRIPTION

In some embodiments of the composition described herein, the weight ratio of glutathione to ascorbic acid is about 7:1. In some embodiments, the weight ratio is about 10:1. In some embodiments, the weight ratio is about 14:1. In several embodiments, the weight ratio ranges from about 4:1, 5:1, 6:1, 7:1, 8:1, 9:1, 10:1, 11:1, 12:1, 13:1, 14:1, 15:1, 1:15, 1:14, 1:13, 1:12, 1:11, 1:10, 1:9, 1:8, 1:7, 1:6, 1:5, 1:4, 1:3, 1:2, 1:1, or any ratio therebetween.

Some embodiments described herein relate to a method of treating a subject, comprising administering a topical composition onto an area of the skin of a subject, wherein the composition comprises: reduced, nanonized, L-glutathione that is non-esterified, non-acetylated, and non-fatty acid attached; gamma cyclodextrin; and ascorbic acid; wherein the weight ratio of glutathione to ascorbic acid is between about 7:1 and 15:1; and wherein the composition is administered between 1 and 10 times per day. In some embodiments, the weight ratio of glutathione to ascorbic acid is between about 1:1 and 1:15.

In some embodiments, the composition further comprises one or more of dexpanthenol, thiamine, benzalkonium chloride, sodium hyaluronate, and acetyl-L-cysteine. In some embodiments, the composition further comprises one or more of dexpanthenol, thiamine, benzalkonium chloride, sodium hyaluronate, acetyl-L-cysteine, and potassium sorbate. In some embodiments, about 0.15 ml of the composition is administered onto the skin per dose. In some embodiments, about 0.5 ml of the composition is administered onto the skin per dose. In some embodiments, about 1.25 ml of the composition is administered onto the skin per dose. Some embodiments further comprise a preservative blend that is a mixture of: Glycerin, Leuconostoc/Radish Root Ferment Filtrate, *Lonicera Japonica* (Honeysuckle) Flower Extract, *Lonicera Caprifolium* (Honeysuckle) Extract, *Populus Tremuloides* Bark Extract, and Gluconolactone.

In some embodiments, the composition is administered once. In some embodiments, the composition is administered once a day. In some embodiments, the composition is administered twice a day. In some embodiments, the composition is administered every 4 hours.

In some embodiments, the duration of administration is 1 day. In some embodiments, the duration of administration is 2 weeks. In some embodiments, the duration of administration is 60 days. In some embodiments, the duration of administration is 4 months.

In some embodiments, the composition is administered to a surface area on the skin of about $0.8$ cm$^2$. In some embodiments, the composition is administered to a surface area on the skin of about 24 in$^2$. In some embodiments, the composition is administered to a surface area on the skin of about 25 in$^2$. Any surface area falling between the above can be used, depending on the embodiment.

In some embodiments, the patient is being treated for one or more of: influenza, COVID-19, herpes simplex, herpes zoster, post herpetic neuralgia, genital herpes, alcohol detoxification, high triglycerides, age or liver spots, and lupus.

Provided herein is a treatment method comprising administering to a patient in need of treatment a composition comprising Cyclodextrin and nanonized L-Glutathione. The composition may optionally include other molecules, such as antioxidants.

In certain embodiments, the Cyclodextrin is gamma Cyclodextrin. The composition sometimes comprises one or more of L-Glutathione and nanonized reduced Glutathione (RealGSH™). In some embodiments the natural molecule is present, wherein the natural molecule comprises at least one of a protein, a fragment thereof, and a polypeptide.

The gamma-Cyclodextrin additionally facilitates transdermal and transmucosal delivery of the molecules, thus bypassing the digestive tract and eliminating the need for intravenous administration. Transdermal stabilized glutathione is a novel form of Glutathione that has been stabilized using encapsulation in gamma-Cyclodextrin ring structures that prevents oxidation of the reduced Glutathione by atmospheric oxygen.

In some embodiments the natural molecule comprises at least one of nucleic acid and a fragment thereof. The fragment thereof may comprise at least one of oligonucleotide, DNA, and RNA.

Antioxidants

An antioxidant is a molecule capable of inhibiting the oxidation of other molecules. Oxidation is a chemical reaction that transfers electrons from a substance to an oxidizing agent. Oxidation reactions can produce free radicals. In turn, these radicals can start chain reactions. When the chain reaction occurs in a cell, it can cause damage or death. Antioxidants terminate these chain reactions by removing free radical intermediates, and inhibit other oxidation reactions. They do this by being oxidized themselves, so antioxidants are often reducing agents including thiols such as GSH, ascorbic acid, or polyphenols. Thiol groups exist at a concentration of approximately 5 mM in animal cells. Glutathione reduces disulfide bonds formed within cytoplasmic proteins to cysteines by serving as an electron donor. In the process, Glutathione is converted to its oxidized form Glutathione disulfide (GSSG).

Although oxidation reactions are crucial for life, they can also be damaging and oxidative stress appears to be an important part of many human diseases. Therefore, plants and animals maintain complex systems of multiple types of antioxidants, such as GSH, vitamin C, and vitamin E as well as enzymes such as catalase, superoxide dismutase, and various peroxidases. Low levels of antioxidants, or inhibition of the antioxidant enzymes, cause oxidative stress and may damage or kill cells.

In certain embodiments the antioxidant comprises at least one of alpha-Lipoic Acid, Ascorbic acid, Uric acid, beta-Carotene, alpha-Tocopherol, dimethylethanolamine (DMAE), CoEnzyme Q10, vitamin E, Carnosine, colloidal silver, and the enzymes catalase, superoxide dismutase, and peroxidase. The composition may comprise a carrier of one or more of a liquid, a spray, an aerosol, a cream, a serum, a tablet, a capsule, a suppository, a lotion, an aqueous solution, a powder, a paste, an ointment, a jelly, a wax, an oil, a lipid, a lipid (cationic or anionic) containing vesicle (such as Lipofectin™), a DNA conjugate, an anhydrous absorption paste, an oil-in-water and water-in-oil emulsion, an emulsion a carbowax (polyethylene glycols of various molecular weights), a semi-solid gel, and a semi-solid mixture containing carbowax.

The antioxidant may be a soluble compound having antioxidant activity and comprising a mixture of two or more of ascorbic acid, ascorbic acid derivatives, L-Cysteine, N-Acetyl Cysteine, L-Carnitine, Acetyl-L-carnitine, Riboflavine and Curcuminoids. The antioxidant may be in the range of 0.001 mole and 100 moles per mole of nanonized L-Glutathione and in certain embodiments the antioxidant is not less than 0.01 mole and not more than 10 moles per mole of nanonized L-Glutathione.

The antioxidant, for example ascorbic acid, may be present at a concentration of 1000 mg/ml, 900 mg/ml, 800 mg/ml, 700 mg/ml, 600 mg/ml, 500 mg/ml, 450 mg/ml, 400 mg/ml, 350 mg/ml, 300 mg/ml, 250 mg/ml, 225 mg/ml, 200 mg/ml, 175 mg/ml, 150 mg/ml, 100 mg/ml, 90 mg/ml, 80 mg/ml, 70 mg/ml, 60 mg/ml, 50 mg/ml, 40 mg/ml, 30 mg/ml, 20 mg/ml, 10 mg/ml, 8 mg/ml, 6 mg/ml, 5 mg/ml, 4 mg/ml, 3 mg/ml, 2 mg/ml, 1 mg/ml, or any amount in between the aforementioned concentrations. The antioxidant, for example ascorbic acid, may be present between about 350 and 150 mg/ml. A sample composition with an antioxidant present at a concentration of 250 mg/ml is shown in Table 1.

TABLE 1

Sample composition.

| Ingredient | Concentration (mg/ml) |
| --- | --- |
| Ascorbic acid | 250 |
| Dexpanthenol | 25 |
| Cyclodextrin | 50 |
| Glutathione | 10 |
| Preservative blend* | 20 |
| Potassium sorbate | 1 |
| Sodium hyaluronate | 1 |

*Preservative blend is a mixture of: Glycerin, Leuconostoc/Radish Root Ferment Filtrate, *Lonicera Japonica* (Honeysuckle) Flower Extract, *Lonicera Caprifolium* (Honeysuckle) Extract, *Populus Tremuloides* Bark Extract, and Gluconolactone.

Cyclodextrin

Cyclodextrins (sometimes called cycloamyloses) are a family of compounds made up of sugar molecules bound together in a ring (cyclic oligosaccharides) and are produced from starch by means of enzymatic conversion. Cyclodextrins are used in food, pharmaceutical, and chemical industries, as well as agriculture and environmental engineering.

Cyclodextrins are composed of 5 or more (1,4)-linked α-D-glucopyranose units. Topologically, Cyclodextrins form a torus with a hydrophobic interior and a hydrophilic exterior. Typical Cyclodextrins contain a number of glucose monomers ranging from six to eight units in a ring, creating a cone shape. Alpha-Cyclodextrin is a six-membered sugar ring molecule, beta-Cyclodextrin is a seven sugar ring molecule, and gamma-Cyclodextrin is an eight sugar ring molecule. Cyclodextrins can be topologically represented as toroids with the larger and the smaller openings of the toroid exposing to the solvent secondary and primary hydroxyl groups respectively. Because of this arrangement, the interior of the toroid is not hydrophobic, but considerably less hydrophilic than the aqueous environment and thus able to host other hydrophobic molecules. In contrast, the exterior is sufficiently hydrophilic to impart water solubility to Cyclodextrins (or their complexes).

This allows Cyclodextrins to act as host molecules that form inclusion complexes with hydrophobic guest molecules. Cyclodextrins are known to influence the percutaneous absorption of therapeutic agents by both a solubilizing action on the drug thus increasing its availability at the absorption site and by an interaction with the free lipids present in the stratum corneum resulting in improvement of transdermal penetration of therapeutic agents.

The formation of the inclusion compounds greatly modifies the physical and chemical properties of the guest molecule, mostly in terms of water solubility. Thus, inclusion compounds of Cyclodextrins with hydrophobic molecules are able to penetrate body tissues, and can be used to release biologically active compounds under specific conditions. The mechanism of controlled degradation of such complexes is sometimes based on pH change of solutions, leading to the cleavage of hydrogen or ionic bonds between the host and the guest molecules. Alternative means for the disruption of the complexes may involve heating or the action of enzymes able to cleave α-1,4 linkages between glucose monomers.

In Cyclodextrin inclusion, one or more guest molecule interacts with the cavity of a Cyclodextrin molecule to form a stable association. Molecules or functional groups of molecules that are less hydrophilic than water can be included in the Cyclodextrin cavity in the presence of water. The "guest molecules" may fit, at least partly, into the Cyclodextrin cavity. The cavity sizes as well as possible chemical modifications determine the affinity of Cyclodextrins to the various molecules. In the case of some low molecular weight molecules, more than one guest molecule may fit into the cavity. Conversely, some high molecular weight molecules may bind more than one Cyclodextrin molecule. Therefore a 1:1 molar ratio is not always achieved. Gamma-Cyclodextrin, as provided herein, exhibits compatibility with Glutathione, and protects the Glutathione molecule sufficiently to usefully extend the Glutathione half-life in the bloodstream.

In the solid state, the guest molecule is molecularly dispersed in the Cyclodextrin matrix, even with gaseous guest molecules. Thus, the guest molecule is effectively protected against any type of reaction, except with Cyclodextrin's hydroxyls. In aqueous solution, the concentration of a poorly soluble guest molecule in the dissolved phase increases significantly. Reactivity of the guest molecule decreases in most cases.

Cyclodextrins are able to form inclusion complexes with a broad range of hydrophobic molecules, with the larger gamma-Cyclodextrin accepting more bulky compounds. As provided herein, Cyclodextrins and gamma-Cyclodextrin in particular can form compounds with peptides, polypeptides, proteins, amino acids, nucleic acids, polynucleotides, DNA, and RNA Anti-oxidants such as ascorbic acid, carnosine, alpha-Lipoic Acid, DMAE, CoEnzuyme Q10 and other molecules such as colloidal silver may enhance the protective function of the complex and perform various other functions.

Cyclodextrin complexation of a drug may increase drug stability, sustaining the release and minimizing the photodegradation of a complexed drug. Cyclodextrin complexation has utility in improving the chemical, physical and thermal stability of drugs. Chemical reactions are necessary in order for an active molecule to degrade upon exposure to oxygen, water, radiation or heat. When a molecule is entrapped within the Cyclodextrin cavity, it is difficult for the reactants to diffuse into the cavity and react with the protected guest.

The stabilized Cyclodextrin-Glutthione compound comes in the form of a gel that is applied topically. The Cyclodextrin ring structures are broken down by naturally occurring enzymes on the skin and the reduced glutathione is absorbed transdermally and enters the bloodstream.

Glutathione

Glutathione (GSH) as provided herein is natural, non-esterified, non-acetylated, and non-fatty acid attached, fostering high bioavailability. Gluthatione is a tripeptide that contains an unusual peptide linkage between the amine group of cysteine and the carboxyl group of the glutamate side-chain. It is an antioxidant, preventing damage to various cellular components caused by reactive oxygen species such as free radicals and peroxides. Glutathione is the most abundant low molecular weight thioltripeptide synthesized in cells and helps to maintain other antioxidants (such as Vitamin C) in the active reduced form. Clinical use of Glutathione in medicine has been limited because of its unstable nature due to the cysteine moiety of the Glutathione. Thus, if Glutathione is given intravenously, much of the Glutathione is oxidized into GSSG in the IV-bag during storage, transport or while being infused. Nebulized forms have also been used but the smell and taste result in poor patient compliance and it is counterintuitive to suggest that aerosolizing a compound that is highly reactive in the presence of atmospheric oxygen is an effective strategy.

In vivo, Glutathione is found almost exclusively in its reduced form, since the enzyme that reverts it from its oxidized form, Glutathione reductase, is constitutively active and inducible upon oxidative stress. In fact, the ratio of reduced Gluathione to oxidized Glutathione within cells is often used as a measure of cellular toxicity. Glutathione helps prevent damage to cells by neutralizing harmful molecules generated during energy production. Glutathione also plays a role in processing medications and cancer-causing compounds (carcinogens), and building DNA, proteins, and other important cellular components.

Glutathione is known as a substrate in both conjugation reactions and reduction reactions-catalyzed by glutathione S-transferase enzymes—in cytosol, microsomes, and mitochondria. However, it is also capable of participating in non-enzymatic conjugation with some chemicals. Glutathione participates in leukotriene synthesis and is a cofactor for the enzyme glutathione peroxidase. It is also important as a hydrophilic molecule that is added to lipophilic toxins and waste in the liver during biotransformation before they can become part of the bile. Glutathione also assists in the detoxification of methylglyoxal, a toxin produced as a by-product of metabolism.

Low Glutathione is strongly implicated in wasting and negative nitrogen balance, as seen in cancer, AIDS, sepsis, trauma, burns and even athletic overtraining. Glutathione supplementation can oppose this process, and in AIDS, for example, result in improved survival rates. Schizophrenia and bipolar disorder are associated with lowered Glutathione. Accruing data suggest that oxidative stress may be a factor underlying the pathophysiology of bipolar disorder (BD), major depressive disorder (MDD), and schizophrenia (SCZ). Glutathione is the major free radical scavenger in the brain. Diminished Glutathione levels elevate cellular vulnerability towards oxidative stress; characterized by accumulating reactive oxygen species. Replenishment of Glutathione using N-acetyl cysteine has been shown to reduce symptoms of these disorders.

Glutathione is an antidote to overdose in the case of N-acetyl-p-benzoquinone imine (NAPQI), the reactive cytochrome P450-reactive metabolite formed by paracetamol (known in the U.S. as acetaminophen), that becomes toxic when Glutathione is depleted by an overdose of acetaminophen. Glutathione conjugates to NAPQI and helps to detoxify it. In this capacity, it protects cellular protein thiol groups, which would otherwise become covalently modified; when all Glutathione has been spent, NAPQI begins to react with the cellular proteins, killing the cells in the process.

Preliminary results on isolated cells indicate Glutathione changes the level of reactive oxygen, which may reduce cancer development. Additional evidence indicates that adequate levels of Glutathione help to control the level of Tumor necrosis factor (TNF)—a group of cytokines that can cause cell death. However, once a cancer has already developed, elevated levels of GSH in tumor cells confers resistance to a number of chemotherapeutic drugs, and thus protects cancerous cells in bone marrow, breast, colon, larynx, and lung cancers.

Excess glutamate at synapses, which may be released in conditions such as traumatic brain injury, can prevent the uptake of cysteine, a necessary building-block of Glutathione. Without the protection from oxidative injury afforded by Glutathione, cells may be damaged or killed.

Raising Glutathione levels through direct supplementation of Glutathione is difficult. Research suggests that Glutathione taken orally is broken down by digestive enzymes and not well absorbed across the gastrointestinal tract. Additionally, natural GSH can be quite rapidly oxidized upon exposure to air. Some attempts have been made to stabilize Glutathione by acetylating or esterifying the Glutathione thiol group.

A complex of nanoized L-Glutathione and gamma-Cyclodextrin protects the Glutathione from degradation and oxidation without the necessity of altering the natural Glutathione molecule.

Nanonized Glutathione Cyclodextrin Complex

Nanonization of a pH-stabilized Glutathione Cyclodextrin complex may facilitate rapid absorption into the bloodstream. In some embodiments sodium hydroxide, hydrochloric acid or other acid is added to the stabilized Glutathione and Gamma Cyclodextrin to adjust the pH of the solution. In various embodiments the pH is adjusted to a pH of not less than 4.00 and not more than 7.8. In certain embodiments the adjusted pH is not less than 5.00 and not more than 7.2. The solution may be nanonized using Ultrasonic waves as known in the art in the range of about 100 Watts. The Ultrasonic waves are sometimes applied for not less than 1 minute and not more than 10 minutes. In certain embodiments the Ultrasonic waves are applied for not less than 3 minutes and not more than 6 minutes.

The size of the resulting nanoparticles may be in the range of between 2 nanometers and 200 nanometers. In certain embodiments the nanoparticles have a size in the range of 2 to 20 nanometers, 20 to 40 nanometers, 40 to 60 nanometers, 60 to 80 nanometers, 80 to 100 nanometers, 100 to 120 nanometers, 120 to 140 nanometers, 140 to 160 nanometers, 160 to 180 nanometers, and 180 to 200 nanometers. In some embodiments the nanoparticles may be of mixed sizes.

Therapeutic Administration and Formulations

Compositions described herein may be effective outpatient treatments of COVID-19 illness. Early treatment may prevent cytokine storm syndrome that may be associated with COVID-19, may decrease the time to resolution of all symptoms, and may restore a patient's feeling of wellbeing.

The composition provided herein may be formulated as a liquid, cream, serum, solid, lotion, oil, emulsion, spray, aerosol, dissolving strip, bolus, suppository, tablet, capsule, or other formulation using compounding and other methods known in the art. In certain embodiments a guest molecule such as gamma-Cyclodextrin and GSH are combined in an aqueous solution comprising ascorbic acid and Benzalkonium chloride, and capped under vacuum after mixing at a pH of between about 3.0 and about 7.0. In some embodiments the pH is about 5.5. In certain embodiments the pH is from about 3.0 to about 4.0, from about 4.0 to about 5.0, from about 5.0 to about 6.0, or from about 6.0 to about 7.0.

The percentage of Cyclodextrin may be from 1% to 50%. The percentage of Cyclodextrin may sometimes be from 1% to 5%, from 5% to 10%, from 10% to 15%, from 15% to 20%, from 20% to 25%, from 25% to 30%, from 30% to 35%, from 35% to 40%, from 40% to 45%, or from 45% to 50%. The percentage of Glutathione or other guest molecule may be from 0.1% to 80%. In certain embodiments the percentage of Glutathione or other guest molecule is from 0.1% to 1%, from 1% to 5%, from 5% to 10%, from 10% to 15%, from 15% to 20%, from 20% to 30%, from 30% to 40%, from 40% to 50%, from 50% to 60%, from 60% to 70%, from 70% to 80%, from 80% to 85%, from 85% to 90%, or from 90 to 95% (or any percentage between the foregoing).

In some embodiments, Cyclodextrin is present at a concentration of approximately 69 mg/ml, 120 mg/ml, 155 mg/ml, or 250 mg/ml. In various embodiments, Glutathione is present at a concentration of approximately 200 mg/ml, 350 mg/ml, or 550 mg/ml. The molar ratio of Glutathione to Cyclodextrin is sometimes 26 to 1. The molar ratio of GSH to Cyclodextrin may be between 1 to 15 or less and 30 to 1 or more. By way of non-limiting example, the molar ratio of Glutathione or other guest molecule to Cyclodextrin may be: 1 to 15, 1 to 14, 1 to 13, 1 to 12, 1 to 11, 1 to 10, 1 to 9, 1 to 8, 1 to 7, 1 to 6, 1 to 5, 1 to 4, 1 to 3, 1 to 2, and 1 to 1, or any fraction of the foregoing ratios. In certain embodiments the molar ratio of GSH or other guest molecule to Cyclodextrin is 1.1 to 1, 1.2 to 1, 1.3 to 1, 1.4 to 1, 1.5 to 1, 1.6 to 1, 1.7 to 1, 1.8 to 1, 1.9 to 1, 2 to 1, 3 to 1, 4 to 1, 5 to 1, 6 to 1, 7 to 1, 8 to 1, 9 to 1, 10 to 1, 11 to 1, 12 to 1, 13 to 1, 14, to, 15 to 1, 16 to 1, 17 to 1, 18 to 1, 19 to 1, 20 to 1, 21 to 1, 22 to 1, 23 to 1, 24 to 1, 25 to 1, 26 to 1, 27 to 1, 28 to 1, 29 to 1, and 30 to 1, or any fraction of the foregoing ratios. In certain embodiments the concentration of Glutathione is 950 mg/ml. In various embodiments the concentration of Cyclodextrin 150 mg/ml. The Cyclodextrin as provided above is sometimes gamma-Cyclodextrin. In some embodiments the combined concentration percentage is 95% GSH in 15% gamma-Cyclodextrin.

Various natural molecules may be combined with Cyclodextrin in a similar fashion to form inclusion complexes. In certain embodiments antioxidants and other molecules may be added, including but not limited to Ascorbic acid, Alpha-Lipoic Acid, Uric acid, alpha Tocopherols, beta Carotenes or any other antioxidant molecules.

Specifically, the composition of certain embodiments disclosed herein contain a nanoized L-Glutathione in a stabilizing solution which may contain an antioxidant. The antioxidant may be any soluble compound having antioxidant activity which may be mixtures of two or more of ascorbic acid, ascorbic acid derivatives, L-Cysteine, N-Acetyl Cysteine, L-Carnitine, Acetyl-L-carnitine, Riboflavine and Curcuminoids. In some embodiments the antioxidant is not less than 0.001 mole and not more than 100 moles per mole of reduced L-Glutathione, and may be not less than 0.01 mole and not more than 10 moles of reduced L-Glutathione.

The composition and method may be administered under physician prescription or over the counter depending upon the natural molecule and other ingredients comprising the composition and upon the condition to be treated. The route of administration is in accord with known methods including without limitation; oral, sublingual, transdermal, cutaneous, subcutaneous, mucosal, transmucosal, inhalation, intralesional, buccal, or by sustained release systems as noted below. In some embodiments the composition as herein provided is administered via a small strip or other form of material that may dissolve in the mouth of the patient. This allows the convenience of a solid form therapy while retaining the advantages of a sublingual or mucosal delivery. The enzymes of the human mouth are capable of dissolving carbohydrates but not of breaking down peptides or proteins or many types of organic molecule. Therefore, the composition may be delivered directly to the bloodstream without being exposed to digestive enzymes or crossing the intestinal barrier, and without the necessity for intravenous delivery.

The therapeutic compositions disclosed herein can be administered through the skin, mucosa, nose, eye, or lung, in formulations including a liquid, cream, serum, lotion, oil, emulsion, gel, paste, powder, liquid or powder aerosol (lyophilized). The composition may be administered parenterally or subcutaneously as desired. The composition may be administered systemically, and may be sterile, pyrogen-free and in a parenterally acceptable solution having due regard for pH, isotonicity, and stability. These conditions are known to those skilled in the art. Briefly, dosage formulations of the compounds described herein are prepared for storage or administration by mixing the compound having the desired degree of purity with physiologically acceptable carriers, excipients, or stabilizers, for example Cyclodextrin and gamma-Cyclodextrin. Such materials are non-toxic to the recipients at the dosages and concentrations employed, and may include buffers such as TRIS HCl, phosphate, citrate, acetate and other organic acid salts; antioxidants such as ascorbic acid, carnosme, alpha-Lipoic Acid; peptides such as polyarginine, proteins, such as serum albumin, gelatin, or immunoglobulins; hydrophilic polymers such as polyvinylpyrrolidinone; amino acids such as glycine, glutamic acid, aspartic acid, or arginine; monosaccharides, disaccharides, and other carbohydrates including cellulose or its derivatives, glucose, mannose, or dextrins; chelating agents such as EDTA; sugar alcohols such as mannitol or sorbitol; counterions such as sodium and/or nonionic surfactants such as TWEEN, PLURONICS or polyethyleneglycol.

Suitable examples of sustained-release preparations include semipermeable matrices of solid hydrophobic polymers containing the composition provided, which matrices are in the form of shaped articles, films or microcapsules. Examples of sustained-release matrices include polyesters, hydrogels (e.g., poly(2-hydroxyethyl-methacrylate), copolymers of L-glutamic acid and gamma ethyl-L-glutamate, non-degradable ethylene-vinyl acetate, degradable lactic acid-glycolic acid copolymers such as poly-D-(−)-3-hydroxybutyric acid.

While polymers such as ethylene-vinyl acetate and lactic acid-glycolic acid enable release of molecules for over 100 days, certain hydrogels release proteins for shorter time periods. When encapsulated proteins remain in the body for a long time, they may denature or aggregate as a result of exposure to moisture at 37° C., resulting in a loss of biological activity and possible changes in immunogenicity. Rational strategies can be devised for protein stabilization depending on the mechanism involved. For example, if the aggregation mechanism is discovered to be intermolecular S—S bond formation through disulfide interchange, stabilization may be achieved by modifying sulfhydryl residues, lyophilizing from acidic solutions, controlling moisture content, using appropriate additives, and developing specific polymer matrix compositions.

The dosage of the composition herein for a given patient will be determined by the therapist or physician taking into consideration the natural molecule comprising the composition and various factors known to modify the action of drugs including severity and type of disease, body weight, sex, diet, time and route of administration, other medications and other relevant clinical factors. Therapeutically effective dosages may be determined by either in vitro or in vivo methods.

An effective amount of the composition herein to be employed therapeutically will depend, for example, upon the therapeutic objectives, the route of administration, and the condition of the patient. Accordingly, the therapist may titer the dosage and modify the route of administration as required to obtain the optimal therapeutic effect. A daily dosage might range from about 0.001 mg/kg to up to 100 mg/kg or more, depending on the factors mentioned above. In some embodiments the dosage is 50, 100, or 200 mg of GSH administered as a topical gel. In some embodiments the dose is administered twice daily, once in the AM and once in the PM. The clinician may administer the therapeutic composition as provided herein until a dosage is reached that achieves the desired effect. The progress of this therapy may be monitored by conventional assays or as described herein.

In some embodiments, approximately 0.15 ml, 0.5 ml, or 1.25 ml of the composition is applied topically. In some embodiments, the composition is applied to an area of the skin of approximately 0.5 cm$^2$ to about 25 in$^2$ (e.g., 0.8 cm$^2$, 24 in$^2$, or 25 in$^2$). In some embodiments, the composition is applied once a day, twice a day, or every four hours. In some embodiments, the composition is applied for a duration of 1, 2, 3, 4, 5, 6, 7, 8, 9, 10, 11, 12, 13, 14, 20, 30, 40, 50, or 60 days. In some embodiments, the composition is applied for a duration of approximately 3, 4, 5, or 6 months, or approximately 1 year.

It will be appreciated that administration of therapeutic entities in accordance with the compositions and methods herein may be administered with suitable carriers, excipients, and other agents that are incorporated into formulations to provide improved transfer, delivery, tolerance, and the like. These formulations include, for example, powders, pastes, ointments, jellies, waxes, oils, lipids, lipid (cationic or anionic) containing vesicles (such as Lipofectin™), DNA conjugates, anhydrous absorption pastes, oil-in-water and water-in-oil emulsions, emulsions carbowax (polyethylene glycols of various molecular weights), semi-solid gels, and semi-solid mixtures containing carbowax. Any of the foregoing mixtures may be appropriate in treatments and therapies in accordance with the present composition, provided that the active ingredient in the formulation is not inactivated by the formulation and the formulation is physiologically compatible and tolerable with the route of administration and as known in the art.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Further provided herein is a method of treatment comprising, in some embodiments, administering a composition of Cyclodextrin, nanonized Glutathione, and an antioxidant to a patient to treat a specific condition. The patient may be an animal selected from the group consisting of mammal, bird, reptile, amphibian, and fish. The mammal is sometimes a human.

In certain embodiments, the condition to be treated comprises one or more of alcohol or drug poisoning, intoxication, alcohol "hang over," toxicity induced by cytotoxic chemotherapy, radiation trauma, AIDS-associated cachexia, HIV Aids, shingles, frostbite, heavy metal poisoning, burns including laser burn, sun burn, traumatic burn, thermal burn, chemical burn, acne, pressure sore, autism, scar tissue, Parkinson's disease, hepatitis B, hepatitis C, upper respiratory virus infections (cold), cystic fibrosis, insect bites (mosquito, spider, etc.), pain in limbs, neuropathy, Reflex Sympathetic Dystrophy (RSD), rheumatoid arthritis, multiple sclerosis, osteoarthritis, psoriasis, psoriatic arthritis, jet lag, kidney disease (CRF, CKD), akathisia, and tardive dyskinesia.

In various embodiments the condition to be treated comprises one or more of obesity, decreased immunity, inflammation, angina, heart disease, and cardiac reperfusion injury, lung-and-neurological-diseases such as acute respiratory-disease, emphysema, pulmonary fibrosis and associated muscle wasting, asthma, migraine headaches; Parkinson's-disease, herpes zoster, HSV, hepatitis B&C, and influenza, fibromyalgia; osteoporosis/osteomalacia, cancer including but not limited to brain, head and neck, thyroid, lung, esophagus, stomach, intestine, liver, pancreas, kidney uterine, ovarian, prostate, leukemia (acute and chronic), lymphoma, multiple myeloma, and others, systemic sclerosis (scleroderma) syndrome, sepsis, trauma, wrinkles, sagging skin, acne, atopic dermatitis and eczema, athletic overtraining and muscle fatigue; schizophrenia, bipolar disorder, major depressive disorder, dementia, autism, Attention Deficit Hyperactive Disorder (ADHD); overdose of acetaminophen, low energy, drug toxicity, eye problems including cataracts, glaucoma, macular degeneration, macular dystrophy, diabetic retinopathy, decreased visual acuity, diabetic retinopathy, and contrast sensitivity; biomolecule imbalances resulting from traumatic head injury or other causes, and infertility in men and women.

In some embodiments, the condition to be treated comprises one of more of COVID-19, herpes simplex, post herpetic neuralgia, genital herpes, high triglycerides, age or liver spots, and lupus.

Further provided herein is an embodiment of a kit for topical application, the kit comprising a complex of Cyclodextrin and nanonized L-Glutathione, a container for dispensing the composition, a composition applicator and one or more of instructions for use.

Reference throughout this specification to "some embodiments," "certain embodiments," "various embodiments," or similar language means that a particular feature, structure, or characteristic described in connection with the embodiment is included in at least one embodiment. Thus, appearances of the phrases "in some embodiments," "in certain embodiments," "in various embodiments," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. One skilled in the relevant art will recognize, however, that embodiments may be practiced without one or more of the specific details, or with other methods, components, materials, and so forth. Rather, language referring to the features and advantages is understood to mean that a specific feature, advantage, or characteristic is included in at least one embodiment. Thus, discussion of the features and advantages, and similar language, throughout this specification may, but does not necessarily, refer to the same embodiment. In other instances, well-known protocols, reagents, materials, or operations are not shown or described in detail to avoid obscuring aspects of an embodiment.

EXAMPLES

Example 1: Randomized Controlled Trial for Treatment of COVID-19 Virus with Glutathione Composition A sample size of 186 adults is selected for the study. Inclusion criteria for selection of the subjects are: laboratory (RT-PCR) positive of SARS-CoV-2, greater than 60 years old, willingness to participate in a randomized controlled trial, a SaO2/SPO2 ratio greater than 95%, and AST/ALT less than 5×normal. Exclusion criteria for selection of the subjects are: patient is positive for COVID-19 but asymptomatic, pulmonary pneumonia secondary to bacterial infection, pregnant, severe or critical illness, and severe or renal failure GFR of less than 50. The subjects selected are those that show symptoms of fever, shortness of breath, or a dry cough at a minimum. The subjects can have additional symptoms such as body aches and pain or fatigue.

Half of the subjects (control group) are given a placebo, and the other half (experimental group) are given the following topical glutathione composition:

Glutathione 350 mg/ml;
Ascorbic acid 50 mg/ml;
Dexpanthenol 2 mg/ml; and
Cyclodextrin 155 mg/ml Each subject will apply 0.5 ml of the composition (or placebo) every 4 hours for 5 days or until symptoms are subdued. After that, the subject will apply 0.5 ml twice a day for 14 days.

All subjects are monitored for time to clinical recovery, which is defined as resolution of fever and cough maintained for at least 72 hours. A fever has resolved when the subject's body temperature reaches 36.6° C. on the surface, 37.2° C. under the armpit and mouth, or 37.8° C. in the rectum and tympanic membrane. A cough has resolved when the subject reports having a slight cough or no cough. Temperature and cough are checked three times daily.

Among the subjects in the control group, only 7% develop a serious disease, as opposed to an estimated 13.8% without treatment. Additionally, only 3% of the subjects in the control group require ventilator management, as opposed to an estimated 6.1% without treatment.

Example 2: Randomized Controlled Trial for Treatment of COVID-19 Virus with Glutathione Composition Ten individuals were included in this experiment. Through a telemedicine visit, they were offered to self-administer Glutaryl™ after its risks and benefits were discussed. Data was collected at the initial telemedicine visit to record their symptoms, age, gender, chronic conditions. Symptoms documented were per the World Health Organization (WHO) criteria. Nausea was not asked of individuals before July 2020 since it was not yet a recognized symptom by the WHO. The administration protocol was four sprays five times a day for five days, then four sprays two times a day for two weeks. It was sprayed on the abdomen and absorbed into the systemic circulation. Clinical response was reviewed via telemedicine visits at 3, 7, and 10 days after receiving Glutaryl™ spray.

Glutaryl™ spray contains the following ingredients: glutathione 200 mg/ml, ascorbic acid 20 mg/ml, and cyclodextrin 69 mg/ml.

Results

Table 2 summarizes the response of the ten individuals. The outcome measures were the days to the resolution of symptoms from both onset of illness and study entry. In all cases, the resolution of all symptoms and restoration of the feeling of wellness was achieved within two to eight days of using Glutaryl™. None required hospitalization.

Cases 2, 4, 5, 7 and 8 recovered after three days or less with early treatment. A total of ten to twelve days elapsed from symptom onset until recovery for cases 1, 3, 6, 9, and 10, which likely reflected the influence of chronic conditions, advanced age, and/or treatment delay.

TABLE 2

Outpatient Glutaryl™ Treatment Outcomes

| | Patient number | | | | | | | | | |
|---|---|---|---|---|---|---|---|---|---|---|
| | 1 | 2 | 3 | 4 | 5 | 6 | 7 | 8 | 9 | 10 |
| | Age (years) | | | | | | | | | |
| | 25 | 26 | 46 | 52 | 26 | 46 | 21 | 11 | 83 | 71 |
| | Chronic conditions | | | | | | | | | |
| Symptoms at the start of treatment | None | None | HTN | None | None | DM, HTN | None | None | None | HTN |
| Fever/chills | | | | | x | x | | | | x |
| Difficulty breathing | x | | x | | | x | | | | |
| Cough | x | | x | x | | x | x | x | x | x |
| Fatigue/loss of energy | x | x | x | x | x | x | | x | x | x |
| New loss of smell | x | | x | x | x | x | | | x | x |
| Diarrhea | | | x | x | x | | | x | | |
| Sore throat | x | x | x | | x | x | | | | x |
| Conjunctivitis (pink eye) | | | x | | | | | | | |
| Runny/stuffy nose | | | x | | x | | | x | | x |
| Headache | x | x | x | x | x | x | x | | x | x |
| Body aches | x | x | x | | x | | x | | x | x |
| Nausea | n/a | n/a | n/a | n/a | x | x | | | x | x |
| Days with symptoms until treatment start | 6 | 0 | 9 | 3 | 2 | 5 | 0 | 0 | 9 | 3 |
| Days on treatment to symptoms resolution | 4 | 2 | 3 | 2 | 3 | 7 | 2 | 2 | 2 | 8 |
| Total days with symptoms | 10 | 2 | 12 | 5 | 5 | 12 | 2 | 2 | 11 | 11 |

HTN = hypertension,
DM = diabetes mellitus,
n/a = not asked

What is claimed is:

1. A topical composition comprising:
   reduced, nanonized, L-glutathione that is non-esterified, non-acetylated, and non-fatty acid attached;
   gamma cyclodextrin;
   ascorbic acid; and
   one or more compounds selected from the group consisting of: dexpanthenol, thiamine, and sodium hyaluronate;
   wherein the weight ratio of glutathione to ascorbic acid is between about 7:1 and 15:1.

2. The composition of claim 1, wherein the weight ratio is about 7:1.

3. A method of treating COVID-19 in a subject, comprising administering a topical composition onto an area of the skin of a subject, wherein the composition comprises:
   reduced, nanonized, L-glutathione that is non-esterified, non-acetylated, and non-fatty acid attached;
   gamma cyclodextrin; and
   ascorbic acid;
   wherein the weight ratio of glutathione to ascorbic acid is between about 7:1 and 15:1; and
   wherein the composition is administered between 1 and 10 times per day.

4. The method of claim 3, wherein the composition further comprises one or more of dexpanthenol, thiamine, benzalkonium chloride, sodium hyaluronate, and acetyl-L-cysteine.

5. The method of claim 3, wherein about 0.5 ml of the composition is administered onto the skin per dose.

6. The method of claim 3, wherein about 1.25 ml of the composition is administered onto the skin per dose.

7. The method of claim 3, wherein the composition is administered once.

8. The method of claim 3, wherein the composition is administered once a day.

9. The method of claim 3, wherein the duration of administration is 1 day.

10. The method of claim 3, wherein the duration of administration is 2 weeks.

11. The method of claim 3, wherein the composition is administered to a surface area on the skin of about 0.8 cm$^2$.

12. A method of treating COVID-19 in a subject, comprising administering a topical composition onto an area of the skin of a subject, wherein the composition comprises:
   reduced, nanonized, L-glutathione that is non-esterified, non-acetylated, and non-fatty acid attached;
   gamma cyclodextrin; and
   ascorbic acid;
   wherein the weight ratio of glutathione to ascorbic acid is between about 1:1 and 1:15; and
   wherein the composition is administered between 1 and 10 times per day.

13. The method of claim 12, wherein the composition further comprises one or more of dexpanthenol, thiamine, benzalkonium chloride, sodium hyaluronate, acetyl-L-cysteine, and potassium sorbate.

14. The method of claim 12, wherein about 0.15 ml of the composition is administered onto the skin per dose.

15. The method of claim 12, wherein the composition is administered once.

16. The method of claim 12, wherein the composition is administered once a day.

17. The method of claim 12, wherein the duration of administration is 1 day.

18. The method of claim 12, wherein the duration of administration is 2 weeks.

19. The method of claim 12, wherein the composition is administered to a surface area on the skin of about 0.8 cm$^2$.

* * * * *